(12) United States Patent
McPherson

(10) Patent No.: US 10,625,413 B1
(45) Date of Patent: Apr. 21, 2020

(54) PICK UP TOOL

(71) Applicant: Lornetta McPherson, Seattle, WA (US)

(72) Inventor: Lornetta McPherson, Seattle, WA (US)

(*) Notice: Subject to any disclaimer, the term of this patent is extended or adjusted under 35 U.S.C. 154(b) by 30 days.

(21) Appl. No.: 16/127,290

(22) Filed: Sep. 11, 2018

(51) Int. Cl.
*B25J 1/04* (2006.01)
*B25J 15/08* (2006.01)
*B25J 19/00* (2006.01)
*B25J 18/02* (2006.01)
*B25J 13/00* (2006.01)
*B25J 15/02* (2006.01)

(52) U.S. Cl.
CPC ............. *B25J 1/04* (2013.01); *B25J 13/006* (2013.01); *B25J 15/024* (2013.01); *B25J 15/08* (2013.01); *B25J 18/025* (2013.01); *B25J 19/005* (2013.01)

(58) Field of Classification Search
CPC ........ B25J 1/04; B25J 13/006; B25J 15/0213; B25J 15/024; B25J 15/08; B25J 15/086; B25J 18/025; B25J 19/005; A47F 13/06
USPC ................... 294/209, 210, 100, 115
See application file for complete search history.

(56) References Cited

U.S. PATENT DOCUMENTS

| 3,384,408 | A | | 5/1968 | Furzey | |
|---|---|---|---|---|---|
| 3,481,641 | A | | 12/1969 | Berger | |
| 3,534,993 | A | * | 10/1970 | Le Vesque, Sr. | .. H01H 85/0208 81/3.8 |
| 4,575,143 | A | | 3/1986 | Nast | |
| 4,711,482 | A | * | 12/1987 | Brown | ........ B25J 1/04 294/107 |
| 4,827,956 | A | * | 5/1989 | Toot | .......... A45B 3/00 135/66 |
| 4,987,634 | A | | 1/1991 | Weihrauch | |
| D342,428 | S | | 12/1993 | Olszak | |
| 5,322,334 | A | * | 6/1994 | Hammer | ............ B05C 17/0205 294/210 |
| 5,348,359 | A | * | 9/1994 | Boozer | ...... B25J 1/02 294/116 |
| 5,381,319 | A | | 1/1995 | Shiao | |
| 5,823,592 | A | * | 10/1998 | Kalidindi | ................ G01N 1/02 294/24 |
| 6,739,220 | B1 | * | 5/2004 | Johnson | .................... B25B 9/00 81/53.1 |
| 8,469,423 | B1 | * | 6/2013 | Crowley, Jr. | ............ B25G 1/04 294/174 |
| 10,034,522 | B1 | * | 7/2018 | Anglade | .................. A45B 3/04 |
| 2004/0100109 | A1 | * | 5/2004 | Johnson | ................. A47F 13/06 294/26 |
| 2009/0121505 | A1 | * | 5/2009 | Shatilla | ..................... B25J 1/04 294/210 |

(Continued)

FOREIGN PATENT DOCUMENTS

GB 1229986 4/1971

*Primary Examiner* — Dean J Kramer

(57) ABSTRACT

The pick up tool is an extension apparatus. The pick up tool is an articulated structure. The pick up tool is configured for use with a targeted object. The pick up tool grasps a targeted object for subsequent manipulation. The span of the length of the pick up tool is adjustable. The pick up tool comprises a clamp, a telescopic structure and a remote control. The telescopic structure forms the extension apparatus of the pick up tool. The clamp forms the articulation of the pick up tool. The clamp grasps the targeted object. The remote control controls the operation of the clamp.

14 Claims, 6 Drawing Sheets

(56) References Cited

U.S. PATENT DOCUMENTS

2011/0170281 A1 7/2011 Shih
2015/0158183 A1* 6/2015 McNay .................. B25J 1/04
74/491

* cited by examiner

PICK UP TOOL

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of performing operations including manipulating devices, more specifically, a rigid manipulator positioned in space by hand. (B25J 1/04)

SUMMARY OF INVENTION

The pick up tool is an extension apparatus. The pick up tool is an articulated structure. The pick up tool is configured for use with a targeted object. The pick up tool grasps a targeted object for subsequent manipulation. The span of the length of the pick up tool is adjustable. The pick up tool comprises a clamp, a telescopic structure, and a remote control. The telescopic structure forms the extension apparatus of the pick up tool. The clamp forms the articulation of the pick up tool. The clamp grasps the targeted object. The remote control controls the operation of the clamp.

These together with additional objects, features and advantages of the pick up tool will be readily apparent to those of ordinary skill in the art upon reading the following detailed description of the presently preferred, but nonetheless illustrative, embodiments when taken in conjunction with the accompanying drawings.

In this respect, before explaining the current embodiments of the pick up tool in detail, it is to be understood that the pick up tool is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pick up tool.

It is therefore important that the claims be regarded as including such equivalent construction insofar as they do not depart from the spirit and scope of the pick up tool. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
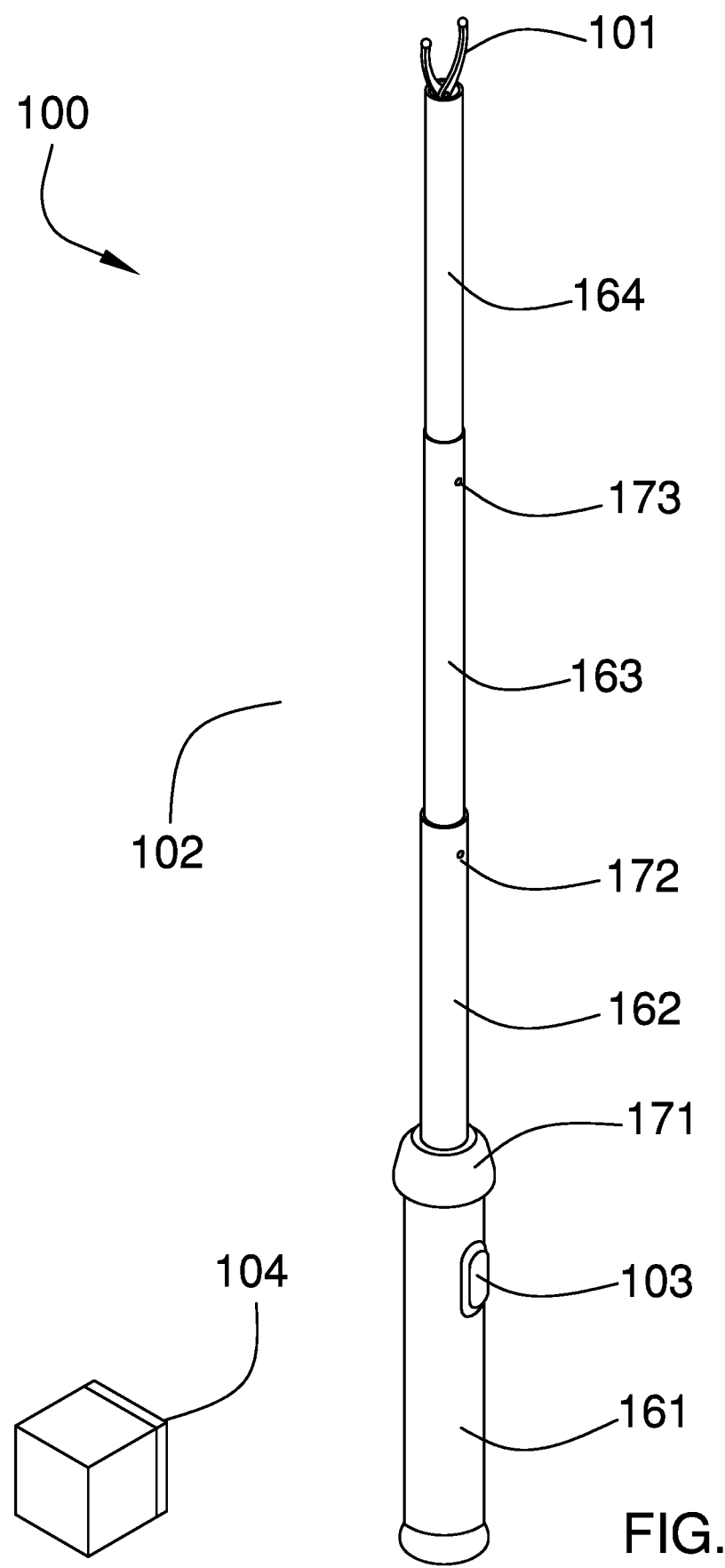
FIG. 1 is a perspective view of an embodiment of the disclosure.
Figure 2:
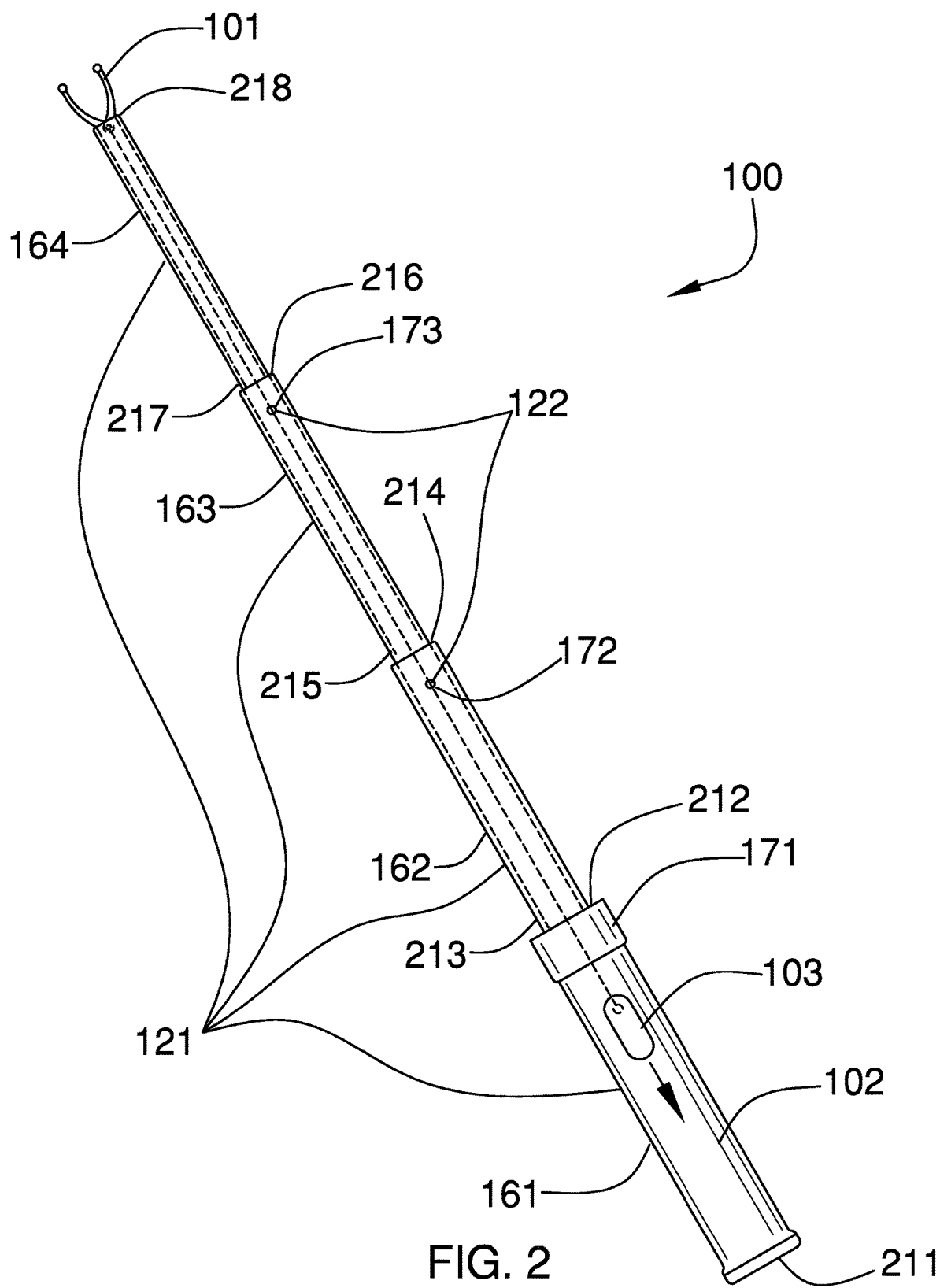
FIG. 2 is a front view of an embodiment of the disclosure.
Figure 3:
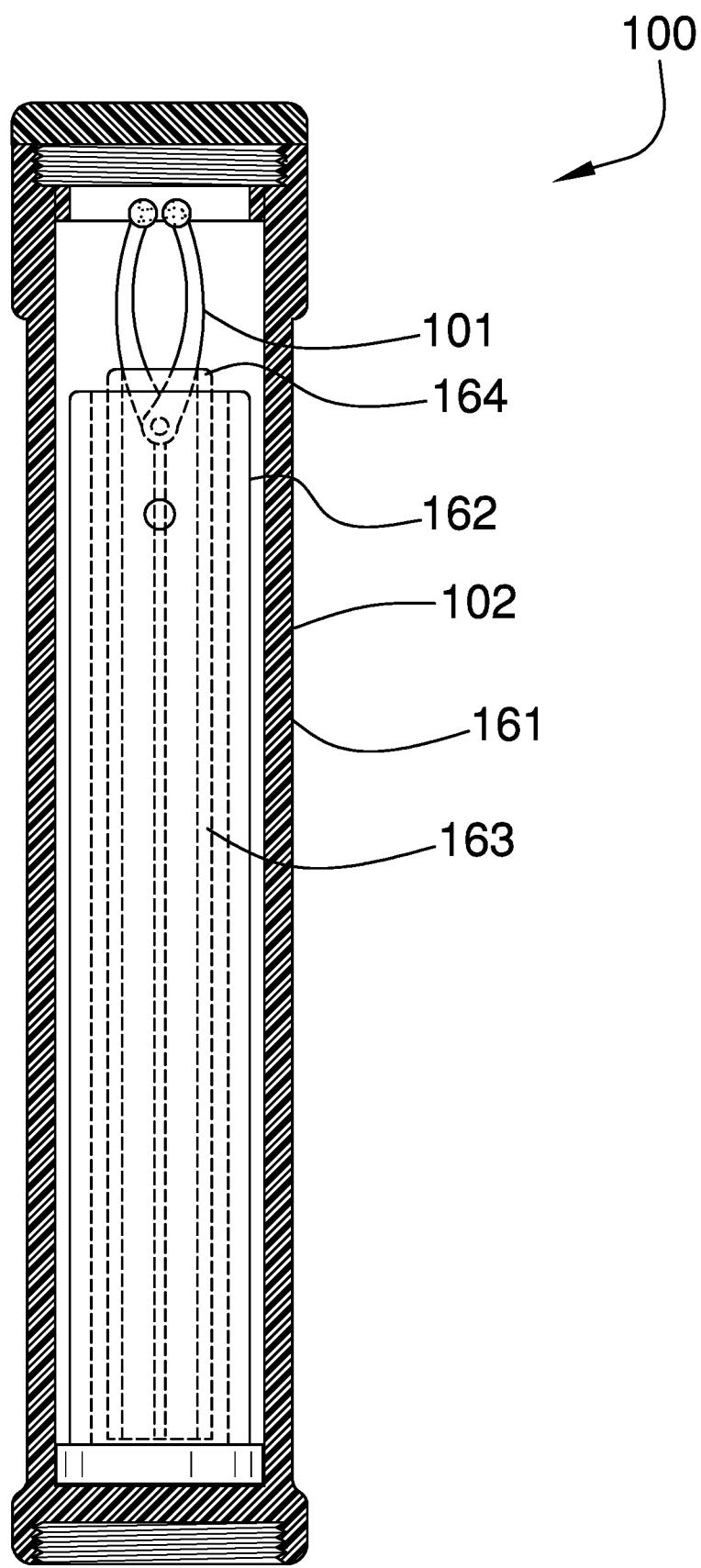
FIG. 3 is a cross-sectional view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 11.

The pick up tool 100 (hereinafter invention) is an extension apparatus. The invention 100 is an articulated structure. The invention 100 is configured for use with a targeted object 104. The targeted object 104 is the object grasped by the clamp 101. The invention 100 grasps a targeted object 104 for subsequent manipulation. The span of the length of the invention 100 is adjustable. The invention 100 comprises a clamp 101, a telescopic structure 102 and a remote control 103. The telescopic structure 102 forms the extension apparatus of the invention 100. The clamp 101 forms the articulation of the invention 100. The clamp 101 grasps the targeted object 104. The remote control 103 controls the operation of the clamp 101.

The telescopic structure 102 is an extension apparatus. The span of the length of the telescopic structure 102 is adjustable such that the reach of a user is extended when reaching for the targeted object 104. The telescopic structure 102 comprises a plurality of arms 121 and a plurality of detents 122. Each of the plurality of arms 121 is an inert structure used to assemble the telescopic structure 102. Each of the plurality of detents 122 is a detent used to interconnect the plurality of arms 121 during the assembly of the telescopic structure 102. The plurality of arms 121 comprises a first arm 161, a second arm 162, a third arm 163, and a fourth arm 164. The plurality of detents 122 comprises a first detent 171, a second detent 172, and a third detent 173.

The first arm 161 is further defined with a first end 211 and a second end 212. The second arm 162 is further defined with a third end 213 and a fourth end 214. The third arm 163 is further defined with a fifth end 215 and a sixth end 216. The fourth arm 164 is further defined with a seventh end 217 and an eighth end 218.

The telescopic structure 102 is an extension apparatus that comprises the first arm 161, the second arm 162, and the first detent 171. The first detent 171 attaches the first arm 161 to the second arm 162. The first arm 161 is a hollow prism that is further defined with an inner dimension. The second arm 162 is a hollow prism that is further defined with an outer dimension. The second arm 162 is geometrically similar to the first arm 161. The span of the outer dimension of the second arm 162 is lesser than the span of the inner dimension of the first arm 161 such that the second arm 162 inserts into the first arm 161 in a telescopic fashion.

This telescopic arrangement of the telescopic structure 102 allows the length of the telescopic structure 102 to be adjusted by adjusting the relative position of the second arm 162 within the first arm 161. The position of the second arm 162 relative to the first arm 161 is held in position using the first detent 171. The first detent 171 is a mechanical device that locks and secures the second arm 162 to the first arm 161. The first detent 171 is selected from the group consisting of a cotter pin 201, a G snap collar 202, a cam lock collar 203, a threaded clutch 204, a split collar lock 205, and a spring-loaded ball lock 206.

The telescopic structure 102 further comprises the third arm 163, and the second detent 172. The second detent 172 attaches the second arm 162 to the third arm 163. The second arm 162 is further defined with an inner dimension. The third arm 163 is a hollow prism that is further defined with an outer dimension. The third arm 163 is geometrically similar to the second arm 162. The span of the outer dimension of the third arm 163 is lesser than the span of the inner dimension of the second arm 162 such that the third arm 163 inserts into the second arm 162 in a telescopic fashion.

This telescopic arrangement of the telescopic structure 102 allows the length of the telescopic structure 102 to be adjusted by adjusting the relative position of the third arm 163 within the second arm 162. The position of the third arm 163 relative to the second arm 162 is held in position using the second detent 172. The second detent 172 is a mechanical device that locks and secures the third arm 163 to the second arm 162. The second detent 172 is selected from the group consisting of a cotter pin 201, a G snap collar 202, a cam lock collar 203, a threaded clutch 204, a split collar lock 205, and a spring-loaded ball lock 206.

The telescopic structure 102 further comprises the fourth arm 164, and the third detent 173. The third detent 173 attaches the third arm 163 to the fourth arm 164. The third arm 163 further defined with an inner dimension. The fourth arm 164 is a hollow prism that is further defined with an outer dimension. The fourth arm 164 is geometrically similar to the third arm 163. The span of the outer dimension of the fourth arm 164 is lesser than the span of the inner dimension of the third arm 163 such that the fourth arm 164 inserts into the third arm 163 in a telescopic fashion.

This telescopic arrangement of the telescopic structure 102 allows the length of the telescopic structure 102 to be adjusted by adjusting the relative position of the fourth arm 164 within the third arm 163. The position of the fourth arm 164 relative to the third arm 163 is held in position using the third detent 173. The third detent 173 is a mechanical device that locks and secures the fourth arm 164 to the third arm 163. The third detent 173 is selected from the group consisting of a cotter pin 201, a G snap collar 202, a cam lock collar 203, a threaded clutch 204, a split collar lock 205, and a spring-loaded ball lock 206.

This paragraph describes the assembly of the telescopic structure 102. The second end 212 of the first arm 161 inserts into the third end 213 of the second arm 162. The fourth end 214 of the second arm 162 inserts into the fifth end 215 of the third arm 163. The sixth end 216 of the third arm 163 inserts into the seventh end 217 of the fourth arm 164. The clamp 101 mounts on the eighth end 218 of the fourth arm 164 of the telescopic structure 102.

The clamp 101 is an articulated grasping device. The clamp 101 is the component of the invention 100 that physically grasps the targeted object 104. The clamp 101 comprises forceps 111, a compression spring 112, a hinge 113, a threaded cap 114, a worm drive 115, an electric motor 116, a motor control 117, and a motor power source 118. The worm drive 115 is further defined with a ninth end 219 and a tenth end 220. The threaded cap 114 is further defined with an eleventh end 221 and a twelfth end 222.

The forceps 111 are a dual bladed device used to grasp the targeted object 104 physically. The forceps 111 comprise a first blade 141 and a second blade 151.

The first blade 141 is the first of two grasping structures used to form the forceps 111. The targeted object 104 is captured between the first blade 141 and the second blade 151. The first blade 141 comprises a first toe 142, a first shank 143, and a first heel 144. The first shank 143 is a shaft that attaches the first heel 144 to the first toe 142. The first heel 144 is the end of the first shank 143 that attaches to the hinge 113. The first toe 142 is a prism-shaped structure formed at the end of the first shank 143 that is distal from the first heel 144. The center axis of the first toe 142 projects radially away from the center axis of the first shank 143.

The second blade 151 is the second of two grasping structures used to form the forceps 111. The targeted object 104 is captured between the second blade 151 and the first blade 141. The second blade 151 comprises a second toe 152, a second shank 153, and a second heel 154. The second shank 153 is a shaft that attaches the second heel 154 to the second toe 152. The second heel 154 is the end of the second shank 153 that attaches to the hinge 113. The second toe 152 is a prism-shaped structure formed at the end of the second shank 153 that is distal from the second heel 154. The center axis of the second toe 152 projects radially away from the center axis of the second shank 153.

The compression spring 112 is a commercially available compression spring 112 used to separate the first blade 141 of the forceps 111 from the second blade 151 of the forceps 111.

The hinge 113 is a commercially available device that: a) attaches the first heel 144 of the first blade 141 to the second heel 154 of the second blade 151 such that the first blade 141 rotates relative to the second blade 151; and, b) attach the forceps 111 to the threaded cap 114.

The threaded cap 114 is a hollow capped tube. The threaded cap 114 is formed with an interior screw thread. The threaded cap 114 screws onto the worm drive 115.

The worm drive 115 is a threaded cylindrical structure. The worm drive 115 is a rotating cylindrical structure.

The electric motor 116 is a commercially available electrical device. The electric motor 116 rotates the worm drive 115. The electric motor 116 further comprises a rotor 191, a stator 192, and a drive shaft 193. The rotor 191, the stator 192, and the drive shaft 193 are defined elsewhere in this disclosure.

The motor control 117 is an electrical circuit associated with the electric motor 116. The motor control 117 is a switching element used to provide electrical energy to the electric motor 116. The motor control 117 is configurable such that the motor control 117 determines the direction of the rotation of the electric motor 116. The motor control 117 is configurable such that the direction of rotation of the electric motor 116 is selectable through the motor control 117. The remote control 103 selects the direction of rotation of the electric motor 116.

The motor power source 118 is a commercially available battery. The motor power source 118 provides the electrical energy required to operate the motor control 117 and the motor power source 118.

The following four paragraphs describe the assembly of the clamp 101.

The first heel 144 of the first blade 141 attaches to the hinge 113 such that the first blade 141 rotates relative to the second blade 151. The second heel 154 of the second blade 151 attaches to the hinge 113 such that the second blade 151 rotates relative to the first blade 141.

The compression spring 112 attaches the first shank 143 of the first blade 141 to the second shank 153 of the second blade 151. The compression spring 112 attaches the first shank 143 to the second shank 153 such that as the compression spring 112 moves towards the relaxed shape the compression spring 112 separates the first shank 143 from the second shank 153. The first blade 141 and the second blade 151 attach to the hinge 113 such that the first toe 142 and the second toe 152 rotate towards and away from each other.

The hinge 113 attaches to the twelfth end 222 of the threaded cap 114 such that the movement of the threaded cap 114 along the worm drive 115 will draw the hinge 113 into and out of the eighth end 218 of the fourth arm 164. The threaded cap 114 screws onto the worm drive 115 such that the rotation of the worm drive 115 moves the twelfth end 222 of the threaded cap 114 in a direction that is parallel to the center axis of the first arm 161. The worm drive 115 attaches to the drive shaft 193 of the rotor 191 of the electric motor 116 such that the center axes of the worm drive 115, the drive shaft 193, and the rotor 191 are aligned to form the axis of rotation of the worm drive 115.

The rotation of the rotor 191 in the stator 192 of the electric motor 116 rotates the worm drive 115. The electric motor 116, the motor control 117, and the motor power source 118 mount in the hollow interior of the fourth arm 164 such that the rotation of the electric motor 116 will rotate the worm drive 115 such that the threaded cap 114 will move in a direction parallel to the axis of rotation of the worm drive 115.

The following four paragraphs describe the operation of the clamp 101.

The electric motor 116 is a commercially available electrical motor. The electric motor 116 converts electrical power drawn from the motor power source 118 into rotational energy that rotates the worm drive 115. The electric motor 116 rotates the drive cylinder 194. The drive cylinder 194 attaches to the electric motor 116 such that the center axis of the drive cylinder 194 aligns with the axis of rotation of the electric motor 116. The electric motor 116 and the drive cylinder 194 are positioned such that the center axis of the drive cylinder 194 aligns with the center axis of the fourth arm 164.

The drive cylinder 194 is formed with an exterior screw thread 195. The rotation of the electric motor 116 rotates the drive cylinder 194 such that the threaded cap 114 will move along the drive cylinder 194 in the direction of the center axis of the drive cylinder 194. The threaded cap 114 is a device that screws onto the drive cylinder 194 to form a threaded connection.

Figure 4:
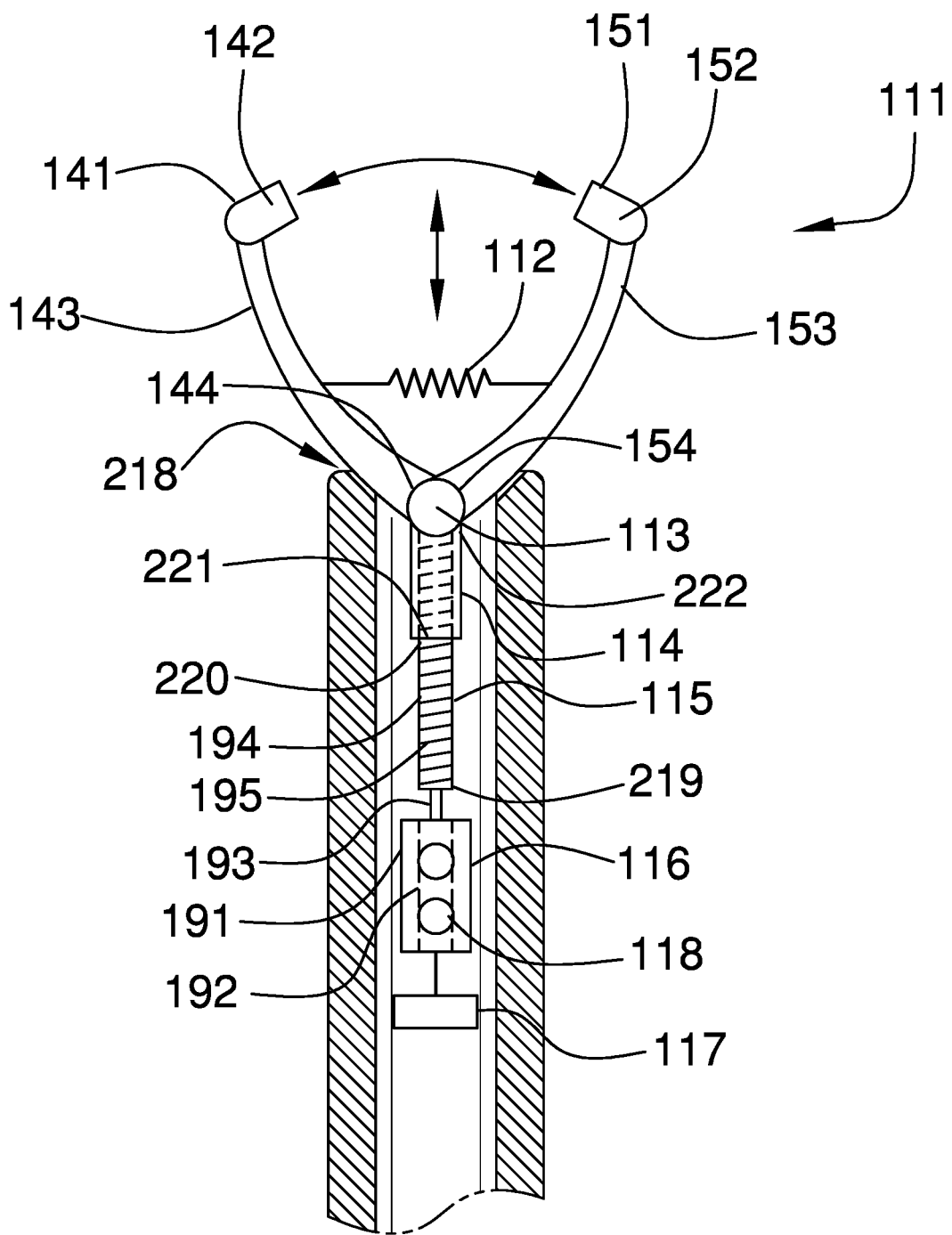
FIG. 4 is a detail view of an embodiment of the disclosure.
Figure 5:
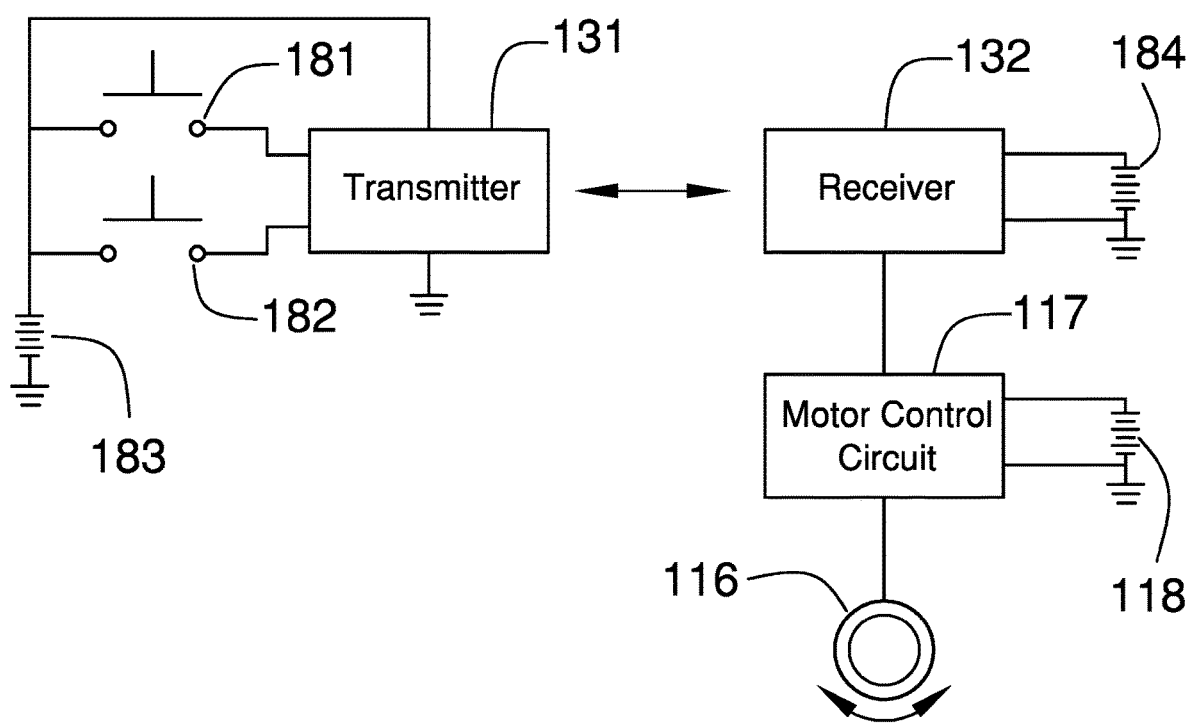
FIG. 5 is a block diagram of an embodiment of the disclosure.
Figure 6:
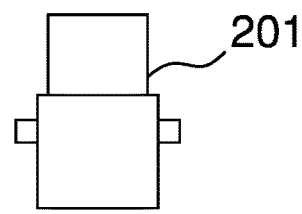
FIG. 6 is a detail view of an embodiment of the disclosure.
Figure 11:
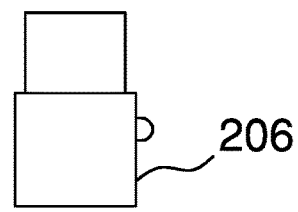
FIG. 11 is a detail view of an embodiment of the disclosure.
Figure 7:
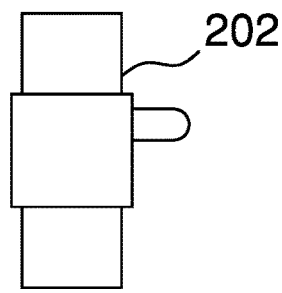
FIG. 7 is a detail view of an embodiment of the disclosure.
Figure 10:
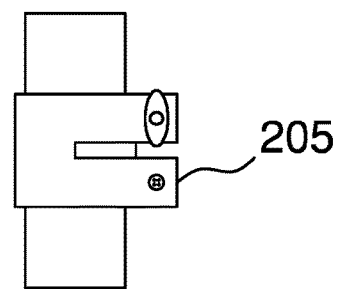
FIG. 10 is a detail view of an embodiment of the disclosure.
Figure 9:
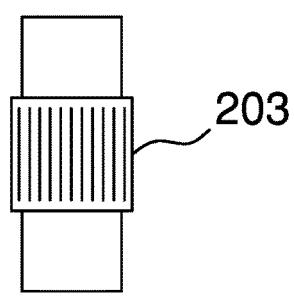
FIG. 9 is a detail view of an embodiment of the disclosure.
Figure 8:
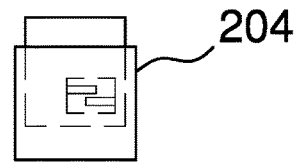
FIG. 8 is a detail view of an embodiment of the disclosure.

As shown most clearly in FIG. 4, the hollow interior of the eighth end 218 of the fourth arm 164 is formed with a negative space. The negative space has the shape of a truncated pyramid. The base of the truncated pyramid forms the eighth end 218 of the fourth arm 164. The motion of the threaded cap 114 into the eighth end 218 of the fourth arm 164 will bring the first shank 143 and the second shank 153 of the forceps 111 into contact with the lateral face of the truncated pyramid. The lateral face of the truncated pyramid will press against the first shank 143 and the second shank 153 such that: a) the first toe 142 and the second toe 152 will move together clipping the forceps 111 around the targeted object 104; and, b) the first shank 143 and the second shank 153 will apply a compression force against the compression spring 112.

The motion of the threaded cap 114 out of the eighth end 218 of the fourth arm 164 will move the first shank 143 and the second shank 153 of the forceps 111 away from the lateral face of the truncated pyramid. As a result, the compression spring 112 will return to its relaxed such that the first toe 142 and the second toe 152 will separate and release the targeted object 104.

The remote control 103 is a radio frequency device used to control the opening and closing of the forceps 111. The remote control 103 mounts in the end of the telescopic structure 102 that is distal from the clamp 101 such that the clamp 101 operates while the telescopic structure 102 is fully extended. In the first potential embodiment of the disclosure, the remote control 103 comprises a commercially available and battery operated 433 MHz relay receiver with a wireless transmitter. The remote control 103 comprises an RC transmitter 131 and an RC receiver 132.

The RC transmitter 131 is a radio frequency transmitting device. The RC transmitter 131 installs in the first arm 161 of the telescopic structure 102. The RC transmitter 131 transmits operating instructions, including the direction of rotation of the electric motor 116, to the RC receiver 132. The RC transmitter 131 further comprises a first transmission switch 181, a second transmission switch 182, and a transmitter power source 183.

The first transmission switch 181 is a momentary switch. The first transmission switch 181 initiates the RC transmitter 131 to send a signal to the RC receiver 132 indicating that the electric motor 116 should rotate in a first direction. The second transmission switch 182 is a momentary switch. The second transmission switch 182 initiates the RC transmitter 131 to send a signal to the RC receiver 132 indicating that the electric motor 116 should rotate in a second direction. The second direction of rotation is opposite to the first direction of rotation. The transmitter power source 183 is a commercially available battery. The transmitter power source 183 provides the electrical energy required to operate the RC transmitter 131.

The RC receiver 132 is a radio frequency receiving device. The RC receiver installs near the electric motor 116. The RC receiver 132: a) receives transmitted operating instructions from the RC transmitter 131; and, b) based on the received instructions initiates the operation of the motor control 117. The RC receiver 132 further comprises a receiver power source 184. The receiver power source 184 is a commercially available battery. The receiver power source 184 provides the electrical energy required to operate the RC receiver 132.

The following definitions were used in this disclosure:

Articulated: As used in this disclosure, articulated refers to two objects that are joined together using a hinge or a flexible joint such that the first object moves relative to the second object. A structure that contains an articulated subcomponent is referred to as an articulated structure.

Battery: As used in this disclosure, a battery is a chemical device consisting of one or more cells, in which chemical energy is converted into electricity and used as a source of power. Batteries are commonly defined with a positive terminal and a negative terminal.

Cant: As used in this disclosure, a cant is an angular deviation from one or more reference lines (or planes) such as a vertical line (or plane) or a horizontal line (or plane).

Capped Tube: As used in this disclosure, a capped tube is a tube with one closed end and one open end.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Compression Spring: As used in this disclosure, a compression spring is a spring that resists forces attempting to compress the spring in the direction of the center axis of the spring. The compression spring will return to its original position when the compressive force is removed.

Correspond: As used in this disclosure, the term correspond is used as a comparison between two or more objects wherein one or more properties shared by the two or more objects match, agree, or align within acceptable manufacturing tolerances.

Detent: As used in this disclosure, a detent is a device for positioning and holding a first object relative to a second object such that the position of the first object relative to the second object is adjustable.

Electric Motor: In this disclosure, an electric motor is a machine that converts electric energy into rotational mechanical energy. An electric motor typically comprises a stator and a rotor. The stator is a stationary hollow cylindrical structure that forms a magnetic field. The rotor is a magnetically active rotating cylindrical structure that is coaxially mounted in the stator. The magnetic interactions between the rotor and the stator physically causes the rotor to rotate within the stator thereby generating rotational mechanical energy. This disclosure assumes that the power source is an externally provided source of DC electrical power. The use of DC power is not critical and an AC power can be used by exchanging the DC electric motor with an AC motor that has a reversible starter winding.

Extension Apparatus: As used in this disclosure, an extension apparatus is a mechanical structure that is used to extend the span of the distance between any two objects or the reach of a first object towards a second object.

Exterior Screw Thread: An exterior screw thread is a ridge wrapped around the outer surface of a tube in the form of a helical structure that is used to convert rotational movement into linear movement.

Feedback: As used in this disclosure, feedback refers to a system, including engineered systems, or a subsystem further comprising an "input" and an "output" wherein the difference between the output of the engineered system or subsystem and a reference is used as, or fed back into, a portion of the input of the system or subsystem. Examples of feedback in engineered systems include, but are not limited to, a fluid level control device such as those typically used in a toilet tank, a cruise control in an automobile, a fly ball governor, a thermostat, and almost any electronic device that comprises an amplifier. Feedback systems in nature include, but are not limited to, thermal regulation in animals and blood clotting in animals (wherein the platelets involved in blood clotting release chemical to attract other platelets)

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. Always use Correspond and One to One Hinge: As used in this disclosure, a hinge is a device that permits the turning, rotating, or pivoting of a first object relative to a second object.

Inner Dimension: As used in this disclosure, the term inner dimension describes the span from a first inside or interior surface of a container to a second inside or interior surface of a container. The term is used in much the same way that a plumber would refer to the inner diameter of a pipe.

Interior Screw Thread: An interior screw thread is a groove that is formed around the inner surface of a tube in the form of a helical structure that is used to convert rotational movement into linear movement.

Momentary Switch: As used in this disclosure, a momentary switch is a biased switch in the sense that the momentary switch has a baseline position that only changes when the momentary switch is actuated (for example when a pushbutton switch is pushed or a relay coil is energized). The momentary switch then returns to the baseline position once the actuation is completed. This baseline position is called the "normal" position. For example, a "normally open" momentary switch interrupts (open) the electric circuit in the baseline position and completes (closes) the circuit when the momentary switch is activated. Similarly, a "normally closed" momentary switch will complete (close) an electric circuit in the baseline position and interrupt (open) the circuit when the momentary switch is activated.

Motor: As used in this disclosure, a motor refers to the method of transferring energy from an external power source into rotational mechanical energy.

Negative Space: As used in this disclosure, negative space is a method of defining an object through the use of open or empty space as the definition of the object itself, or, through the use of open or empty space to describe the boundaries of an object.

N-gon: As used in this disclosure, an N-gon is a regular polygon with N sides wherein N is a positive integer number greater than 2.

One to One: When used in this disclosure, a one to one relationship means that a first element selected from a first set is in some manner connected to only one element of a second set. A one to one correspondence means that the one to one relationship exists both from the first set the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Power Source: As used in this disclosure, a power source is a source of the energy that enables the operation of the present disclosure. Examples of external power sources include, but are not limited to, electrical power sources and compressed air sources.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Radial: As used in this disclosure, the term radial refers to a direction that: 1) is perpendicular to an identified central axis; or, 2) projects away from a center point.

Receiver: As used in this disclosure, a receiver is a device that is used to receive and demodulate electromagnetic radiation such as radio signals.

Relaxed Shape: As used in this disclosure, a structure is considered to be in its relaxed state when no shear, strain, or torsional forces are being applied to the structure.

Remote Control: As used in this disclosure, remote control means the establishment of control of a device from a distance. Remote control is generally accomplished through the use of an electrical device that generates electrically based control signals that are transmitted via radio frequencies or other means to the device.

Servo Motor: As used in this disclosure, a servo motor is an electrical motor that further incorporates a feedback circuit that allows for the precise angular positioning of the electric motor.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Switch: As used in this disclosure, a switch is an electrical device that starts and stops the flow of electricity through an electric circuit by completing or interrupting an electric circuit. The act of completing or breaking the electrical circuit is called actuation. Completing or interrupting an electric circuit with a switch is often referred to as closing or opening a switch respectively. Completing or interrupting an electric circuit is also often referred to as making or breaking the circuit respectively.

Switching Element: This is a device that closes and opens an electrical circuit in response to an electrical control signal.

Telescopic: As used in this disclosure, telescopic is an adjective that describes an object made of sections that fit or slide into each other such that the object can be made longer or shorter by adjusting the relative positions of the sections.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Transmitter: As used in this disclosure, a transmitter is a device that is used to generate and transmit electromagnetic radiation such as radio signals.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Tube: As used in this disclosure, the term tube is used to describe a rigid hollow prism with two open ends. While tubes that are suitable for use in this disclosure are often used to transport or conveys fluids or gases, the purpose of the tubes in this disclosure is structural. In this disclosure, the terms inner dimension and outer dimension of a tube are used as they would be used by those skilled in the plumbing arts.

Worm Drive: As used in this disclosure, a worm drive refers to a mechanical arrangement where a rotating cylinder further comprising an exterior screw thread is used to: 1) rotate a gear; or 2) move a plate formed with an interior screw thread in a linear fashion in the direction of the center axis of the rotating cylinder. Worm drives are also referred to as worm gears.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A rigid manipulator comprising:
a clamp, a telescopic structure and a remote control;
wherein the clamp and the remote control attach to the telescopic structure;
wherein the rigid manipulator is an extension apparatus;
wherein the rigid manipulator is an articulated structure;
wherein the rigid manipulator is configured for use with a targeted object;
wherein the rigid manipulator grasps a targeted object for subsequent manipulation;
wherein the span of the length of the rigid manipulator is adjustable;
wherein the telescopic structure is an extension apparatus that comprises a first arm, a second arm, and a first detent;
wherein the first detent attaches the first arm to the second arm;
wherein the first arm is a hollow prism that is further defined with an inner dimension;
wherein the second arm is a hollow prism that is further defined with an outer dimension;
wherein the second arm is geometrically similar to the first arm;
wherein the span of the outer dimension of the second arm is lesser than the span of the inner dimension of the first arm such that the second arm inserts into the first arm in a telescopic fashion;
wherein the telescopic structure further comprises a third arm, and a second detent;
wherein the second detent attaches the second arm to the third arm;
wherein the second arm is further defined with an inner dimension;
wherein the third arm is a hollow prism that is further defined with an outer dimension;
wherein the third arm is geometrically similar to the second arm;
wherein the span of the outer dimension of the third arm is lesser than the span of the inner dimension of the second arm such that the third arm inserts into the second arm in a telescopic fashion;
wherein the telescopic structure further comprises a fourth arm, and a third detent;
wherein the third detent attaches the third arm to the fourth arm;
wherein the third arm is further defined with an inner dimension;
wherein the fourth arm is a hollow prism that is further defined with an outer dimension;
wherein the fourth arm is geometrically similar to the third arm;
wherein the span of the outer dimension of the fourth arm is lesser than the span of the inner dimension of the third arm such that the fourth arm inserts into the third arm in a telescopic fashion;
wherein the first arm is further defined with a first end and a second end;
wherein the second arm is further defined with a third end and a fourth end;
wherein the third arm is further defined with a fifth end and a sixth end;
wherein the fourth arm is further defined with a seventh end and an eighth end;
wherein the clamp mounts on the eighth end of the fourth arm of the telescopic structure;
wherein the second end of the first arm inserts into the third end of the second arm;
wherein the fourth end of the second arm inserts into the fifth end of the third arm;
wherein the sixth end of the third arm inserts into the seventh end of the fourth arm;
wherein the hollow interior of the eighth end of the fourth arm is formed with a negative space;
wherein the negative space has the shape of a truncated pyramid;
wherein the base of the truncated pyramid forms the eighth end of the fourth arm;
wherein the clamp comprises forceps, a compression spring, a hinge, a threaded cap, a worm drive, an electric motor, a motorcontrol, and a motor power source;
wherein the compression spring attaches to the forceps;
wherein the hinge attaches the forceps to the threaded cap;
wherein the threaded cap attaches the hinge to the worm drive;
wherein the worm drive attaches the threaded cap to the electric motor;
wherein the electric motor is controlled by the motor control and the motor power source;
wherein the worm drive is further defined with a ninth end and a tenth end;
wherein the threaded cap is further defined with an eleventh end and a twelfth end.

2. The rigid manipulator according to claim 1
wherein the telescopic structure is an extension apparatus;
wherein the clamp forms the articulation of the rigid manipulator;
wherein the clamp grasps the targeted object;
wherein the clamp is an articulated grasping device;

wherein the remote control controls the operation of the clamp.

3. The rigid manipulator according to claim 2
wherein the position of the second arm relative to the first arm is held in position using the first detent;
wherein the first detent is a mechanical device that locks and secures the second arm to the first arm;
wherein the first detent is selected from the group consisting of a cotter pin, a G snap collar, a cam lock collar, a threaded clutch, a split collar lock, and a spring-loaded ball lock.

4. The rigid manipulator according to claim 3
wherein the position of the third arm relative to the second arm is held in position using the second detent;
wherein the second detent is a mechanical device that locks and secures the third arm to the second arm;
wherein the second detent is selected from the group consisting of a cotter pin, a G snap collar, a cam lock collar, a threaded clutch, a split collar lock, and a spring-loaded ball lock.

5. The rigid manipulator according to claim 4
wherein the position of the fourth arm relative to the third arm is held in position using the third detent;
wherein the third detent is a mechanical device that locks and secures the fourth arm to the third arm;
wherein the third detent is selected from the group consisting of a cotter pin, a G snap collar, a cam lock collar, a threaded clutch, a split collar lock, and a spring-loaded ball lock.

6. The rigid manipulator according to claim 5
wherein the forceps comprise a first blade and a second blade;
wherein the targeted object is captured between the first blade and the second blade;
wherein the first blade comprises a first toe, a first shank, and a first heel;
wherein the first shank is a shaft that attaches the first heel to the first toe;
wherein the second blade comprises a second toe, a second shank, and a second heel;
wherein the second shank is a shaft that attaches the second heel to the second toe.

7. The rigid manipulator according to claim 6
wherein the first heel is the end of the first shank that attaches to the hinge;
wherein the first toe is a prism-shaped structure formed at the end of the first shank that is distal from the first heel;
wherein the center axis of the first toe projects radially away from the center axis of the first shank;
wherein the second heel is the end of the second shank that attaches to the hinge;
wherein the second toe is a prism-shaped structure formed at the end of the second shank that is distal from the second heel;
wherein the center axis of the second toe projects radially away from the center axis of the second shank.

8. The rigid manipulator according to claim 7
wherein the compression spring separates the first blade of the forceps from the second blade of the forceps;
wherein the hinge attaches the first heel of the first blade to the second heel of the second blade such that the first blade rotates relative to the second blade;
wherein the threaded cap is a hollow capped tube;
wherein the threaded cap is formed with an interior screw thread;
wherein the threaded cap screws onto the worm drive;
wherein the worm drive is a threaded cylindrical structure;
wherein the worm drive is a rotating cylindrical structure.

9. The rigid manipulator according to claim 8
wherein the electric motor rotates the worm drive;
wherein the electric motor further comprises a rotor, a stator, and a drive shaft;
wherein the motor control is an electrical circuit associated with the electric motor;
wherein the motor control is a switching element used to provide electrical energy to the electric motor;
wherein the motor control is configurable such that the motor control determines the direction of the rotation of the electric motor;
wherein the motor control is configurable such that the direction of rotation of the electric motor is selectable through the motor control;
wherein the remote control selects the direction of rotation of the electric motor.

10. The rigid manipulator according to claim 9
wherein the remote control comprises an RC transmitter and an RC receiver;
wherein the RC transmitter is a radio frequency transmitting device;
wherein the RC transmitter installs in the first arm of the telescopic structure;
wherein the RC receiver is a radio frequency receiving device;
wherein the RC receiver installs by the electric motor.

11. The rigid manipulator according to claim 10
wherein the RC transmitter further comprises a first transmission switch, a second transmission switch, and a transmitter power source;
wherein the first transmission switch is a momentary switch;
wherein the second transmission switch is a momentary switch;
wherein the transmitter power source provides the electrical energy required to operate the RC transmitter;
wherein the RC receiver further comprises a receiver power source;
wherein the receiver power source provides the electrical energy required to operate the RC receiver.

12. The rigid manipulator according to claim 11
wherein the first transmission switch initiates the RC transmitter to send a signal to the RC receiver indicating that the electric motor should rotate in a first direction;
wherein the second transmission switch initiates the RC transmitter to send a signal to the RC receiver indicating that the electric motor should rotate in a second direction;
wherein the second direction of rotation is opposite to the first direction of rotation;
wherein the RC receiver: a) receives transmitted operating instructions from the RC transmitter; and, b) based on the received instructions initiates the operation of the motor control.

13. The rigid manipulator according to claim 12
wherein the first heel of the first blade attaches to the hinge such that the first blade rotates relative to the second blade;
wherein the second heel of the second blade attaches to the hinge such that the second blade rotates relative to the first blade;
wherein the compression spring attaches the first shank of the first blade to the second shank of the second blade;

wherein the compression spring attaches the first shank to the second shank such that as the compression spring moves towards the relaxed shape the compression spring separates the first shank from the second shank;

wherein the first blade and the second blade attach to the hinge such that the first toe and the second toe rotate towards and away from each other;

wherein the hinge attaches to the twelfth end of the threaded cap such that the movement of the threaded cap along the worm drive will draw the hinge into and out of the eighth end of the fourth arm;

wherein the threaded cap screws onto the worm drive such that the rotation of the worm drive moves the twelfth end of the threaded cap in a direction that is parallel to the center axis of the first arm;

wherein the worm drive attaches to the drive shaft of the rotor of the electric motor such that the center axes of the worm drive, the drive shaft, and the rotor are aligned to form the axis of rotation of the worm drive;

wherein the electric motor, the motor control, and the motor power source mount in the hollow interior of the fourth arm such that the rotation of the electric motor will rotate the worm drive such that the threaded cap will move in a direction parallel to the axis of rotation of the worm drive.

14. The rigid manipulator according to claim 13 wherein the motor power source is a battery;

wherein the transmitter power source is a commercially available battery;

wherein the receiver power source is a commercially available battery;

wherein the remote control comprises a 433 MHz relay receiver with a wireless transmitter kit.

* * * * *